United States Patent Office 3,437,492
Patented Apr. 8, 1969

3,437,492
LIQUID SHORTENINGS
Gabriel P. Lensack, Wilmington, Del., assignor to Atlas Chemical Industries, Inc., Wilmington, Del., a corporation of Delaware
No Drawing. Filed Aug. 2, 1965, Ser. No. 476,644
Int. Cl. A23d 5/00
U.S. Cl. 99—118                                    15 Claims

ABSTRACT OF THE DISCLOSURE

Liquid shortenings are disclosed which are clear, stable, and effective for the production of baked goods of excellent volume and texture and which comprise a normally liquid edible triglyceride oil containing dissolved therein an emulsifier prepared by reacting propylene oxide with a fatty acid containing from 12 to 18 carbon atoms, in the presence of a sufficient amount of a catalyst selected from the group consisting of potassium hydroxide, potassium salts of weak organic acids, potassium alcoholates, and mixtures thereof, to furnish at least about 1.0% of KOH equivalent based on the weight of the fatty acid, at temperatures between about 100° C. and about 160° C., until the acid number decreases to less than about 10, venting unreacted propylene oxide and neutralizing the catalyst before the acid number has decreased to less than about 1 with at least about 90 mol percent of acid, based on the amount of catalyst charged, which forms a potassium salt that is insoluble in the reaction product, and separating the potassium salt therefrom, the proportion and composition of emulsifier being so chosen that it provides from about 2% to about 12% by weight of emulsifier based on the liquid shortening as a whole and no more than about 6% by weight of stearic acid ester.

---

The present invention relates to shortening compositions and, more particularly, to stable, clear, liquid shortening compositions which are highly effective for the production of baked goods of excellent volume and texture and which comprise normally liquid edible triglyceride oils containing certain emulsifiers, hereafter described in detail.

The liquid shortenings as the term is used herein, and as it is commonly employed in the art, comprise oils of vegetable or animal origin, typical examples of which are soya bean oil, palm kernel oil, peanut oil, corn oil, olive oil, cottonseed oil, safflower oil, or mixtures thereof. Such liquid shortenings have not come into any appreciable use in the bakery, or in various allied fields, because the results which are obtained through the use thereof, particularly so far as the quality and characteristics of the baked goods are concerned, have left much to be desired. Liquid shortenings produce baked products with very poor texture, coarse grain, and low volume, so much so that the products are often commercially unsalable.

In an effort to improve liquid shortenings, it has become the practice in recent years to admix with such shortenings an emulsifier, such as monoglycerides and diglycerides, polyglycerides, lactylated esters, sorbitan monostearate, polyoxyethylene (20) sorbitan monostearae, polyoxyethylene (20) sorbitan tristearate, and the like. Although the addition of such emulsifiers to liquid shortenings results in substantial improvement in cake quality, the emulsifiers precipitate out of the liquid shortenings at room temperatures. Temperature variations during storage hasten the separation tendencies. Cakes baked from such shortenings are of good quality but the shortenings have to be heated and/or agitated prior to use to completely disperse the emulsifier system. Such procedure is undesirable and cumbersome in a modern bakery or in the home.

In accordance with the present invention, liquid shortenings containing emulsifiers have been developed which overcome disadvantages of liquid shortenings which have herefore been known. The liquid shortening compositions of the present invention are not only easy to handle, and therefore, simplify the problems of the large as well as the small commercial baking establishments but, in addition, such shortenings have considerable versatility and can be used, for instance, not only in the baking of cakes, sweet rolls, cookies, pie dough, and the like, but also as ingredients of prepared cake mixes, doughnut mixes, in icings, and for various other purposes. The liquid shortenings of the present invention are characterized by good flavor, color, odor, stability, and have the ability to incorporate air and hold it for the desired period in cake batters. The emulsifiers which are added to the liquid triglyceride oil are readily soluble therein at room temperature, do not crystallize therefrom even on long standing, are stable, and the liquid shortenings can be used at room temperature in admixture with cake batter ingredients or the like into which they are incorporated. The liquid shortenings of the present invention tend to gel or solidify at low temperatures but they readily go back to a clear liquid stage when the shortening is brought back to room temperature without heating and without adverse effect on the solubility of the emulsifier therein or in baking performance.

The emulsifiers which are utilized in accordance with the present invention comprise propylene glycol monoesters prepared by reacting propylene oxide with fatty acid in the presence of a sufficient amount of a catalyst selected from the group consisting of potassium hydroxide, potassium salts of weak organic acids, potassium alcoholates, and admixtures thereof, to furnish at least about 1.0% of KOH equivalent based on the weight of the fatty acid, at temperatures between about 100° C. and about 160° C. until the acid number decreases to less than about 10, venting the unreacted propylene oxide and neutralizing the catalyst before the acid number has decreased to less than about 1 with at least about 90 mol percent of acid, based on the amount of catalyst charged, which forms a potassium salt that is insoluble in the reaction product, and separaing the potassium salt from the propylene glycol monoester of the fatty acid.

Fatty acids which may be used to prepare the emulsifiers of the present invention are those monobasic fatty acids containing from 12 to 18 carbon atoms. The monobasic fatty acids which may be used include straight chain, branched chain, saturated, and unsaturated acids. Representative fatty acids include lauric acid, tridecoic acid, myristic acid, pentadecanoic acid, palmitic acid, margaric acid, stearic acid, oleic acid, and the like. Mixtures of monobasic carboxylic acids may also be used. The preferred monobasic carboxylic acid is a mixture of stearic acid and palmitic acid containing about 40–60% stearic acid and 60–40% palmitic acid and preferably about 50% stearic acid and about 50% palmitic acid.

It is important that the reaction be terminated before the fatty acid is completely reacted with propylene oxide. If the reaction is carried too far, the yield for propylene glycol monoester will decrease and higher yields of propylene glycol diester and free glycol will be obtained. The highest yields of propylene glycol monoester will be obtained if the reaction is terminated when the acid number has decreased to within the range of 1 to 10, preferably 2 to 5.

It is desirable to maintain the reaction temperature between about 100° C. and about 160° C. Temperatures below 100° C. result in very slow reactions which tend to make the process uneconomical. Temperatures above 160° C. tend to cause undesirable side reactions. The preferred temperature is about 115° C. to about 130° C.

The propylene oxide is preferably added to the mixture of fatty acid and catalyst which has been preheated to reaction temperatures since it is desirable to minimize the time the reaction mixture is exposed to elevated temperatures. Prolonged heating with or without excess propylene oxide will result in a decrease in monoester content of the product. Furthermore, at reaction temperatures, it is preferable to add the oxide gradually. If the entire propylene oxide charge is added at one time, it may be impossible to control the reaction conditions and, because of its highly exothermic nature, an explosive reaction may ensue. The propylene oxide should be added at such a rate that unreacted propylene oxide is always present. The propylene oxide is usually added to the reaction mixture under pressure. While propylene oxide and fatty acid may be reacted at pressures in the range of from about 1 to about 10 atmospheres, pressures moderately above atmospheric pressure, in the range of from about 2 to 5 atmospheres, are preferred.

The amount of propylene oxide charged is controlled by two conflicting considerations. Large amounts of propylene oxide drive the reaction to completion. However, any substantial amounts of unreacted propylene oxide must be recovered for economic reasons. Hence, it is desirable to keep the amount of propylene oxide low so that any unreacted propylene oxide may be vented to the atmospheric without substantial economic loss, and, at the same time, to use sufficient amounts of propylene oxide to yield favorable product distribution. Such results can be obtained by using 1.0 to 1.2 molar proportions of propylene oxide to one molar proportion of free fatty acid. It being understood that larger amounts of propylene oxide can be used if one is not concerned with the loss of unreacted propylene oxide or the expense of recovery.

The amount of dipropylene glycol and tripropylene glycol (free and/or esterified) formed are highly dependent on the nature and concentration of the catalyst. The preferred catalyst is potassium hydroxide, however, potassium alcoholates and potassium salts of weak organic acids, such as potassium methylate, potassium acetate, potassium stearate, potassium carbonate, and the like can also be used. The amount of catalyst should be at least about 1.0% (KOH equivalent), preferably about 1.5%, based on the weight of fatty acid charged. The dipropylene glycol and tripropylene glycol contents decrease with increasing catalyst concentration up to a catalyst concentration of about 1.5%. Undesirably large amounts of soap are present in the reaction product when the catalyst concentration is above about 2% by weight of the fatty acid charged.

When the reaction mass has the desired acid number, the excess propylene oxide is vented and the catalyst neutralized with an acid that will form an insoluble potassium salt which can easily be removed, such as mineral acid or an aqueous solution of an organic acid such as citric acid. The preferred acid is phosphoric acid $(H_3PO_4)$ Neutralization of the catalyst with acid precipitates a potassium salt of the acid which can be removed by any suitable means, such as by filtration. Diatomaceous earth may be added to facilitate the filtration.

The amount of acid used to neutralize the catalyst controls the degree of clearness or haziness in the emulsified liquid shortening compositions. The amount of acid should be at least 90 mol percent, preferably 95–105 mol percent, of the catalyst charged. If less than 90 mol percent of acid is used, the emulsifier tends to separate from the oil. The use of more than 105 mol percent of acid results in the presence of undesirably large amounts of acid.

The following examples are illustrative of the production of emulsifiers and reaction products containing the same which are utilized pursuant to the present invention. It will be appreciated, of course, that the proportions of reacting ingredients, times of reaction, and temperatures of reaction are somewhat variable; and selection of different fatty acids and catalysts can readily be effected in the light of the guiding principles and teachings which are disclosed herein. The examples, therefore, are not in any way to be construed as limitative of the scope of the emulsifiers whose use is encompassed by the present invention.

EXAMPLE 1

200 lbs. of Industrene 4516 double pressed stearic acid (45% stearic acid, 45% palmitic acid, 5% myristic acid and less than 5% oleic acid) and 1513 grams of potassium hydroxide (90% assay) were charged to a 50 gallon autoclave, heated to 120° C., and full vacuum pulled on the autoclave for 30 minutes. The vauum was released and 42.5 lbs. of propylene oxide charged to the autoclave at 50 p.s.i.g. of pressure while maintaining the temperature at 120° C. The excess propylene oxide was vented to the atmosphere when the acid number had decreased to 2. The reaction mixture was transferred to a spray deodorizer and deodorized for 30 minutes at 120° C. and 10 mm. or less of pressure. The deodorized product was treated with 2700 grams of 85% $H_3PO_4$ and 350 grams of S-51 Darco activated carbon for 30 minutes at 120° C. 100 grams of diatomaceous earth (Hyflo Super Cel) was added and the mixture filtered. The product contained 86% propylene glycol monoester, 7% propylene glycol diester, and 0.64% free propylene glycol. Hydrolysis of 100 grams of the product yielded 0.34 gram of dipropylene glycol and 0.01 gram of tripropylene glycol.

EXAMPLE 2

200 lbs. of Industrene 254 fatty acid (50–54% stearic acid and 40–44% palmitic acid) and 1513 grams of potassium hydroxide (90% assay) were charged to an autoclave, heated to 120° C, and full vacuum pulled on the autoclave for 30 minutes. The vacuum was released and 41 lbs. of propylene oxide charged to the autoclave at 50 p.s.i.g. of pressure while maintaining the temperature at 120° C. The excess propylene oxide was vented to the atmosphere when the acid number had decreased to 4.3. The reaction mixture was transferred to a spray deodorizer and deodorized for 30 minutes at 120° C. and 10 mm. or less of pressure. The deodorized product was treated with 2700 grams of 85% $H_3PO_4$ and 350 grams of S-51 Darco activated carbon for 30 minutes at 120° C. 100 grams of diatomaceous earth (Hyflo Super Cel) was added and the mixture filtered. The final product contained 82% propylene glycol monoester, 10% propylene glycol diester, 0.29% free propylene glycol, and 0.17% water. Hydrolysis of 100 grams of the product yielded 0.25 gram of dipropylene glycol and 0.02 gram of tripropylene glycol.

EXAMPLE 3

Example 2 was repeated except that the propylene oxide was vented to the atmosphere when the acid number had decreased to 4.8. The final product contained 85% propylene glycol monoester, 6% propylene glycol diester, 0.41% free propylene glycol, and 0.23% water. Hydrolysis of 100 grams of the product yielded 0.26 gram of dipropylene glycol and 0.01 gram of tripropylene glycol.

EXAMPLE 4

4000 grams of Hystrene 9012 fatty acid (92% lauric acid) and 66.6 grams of potassium hydroxide (90% assay) were charged to a two gallon autoclave, heated to 120° C. and full vacuum pulled on the autoclave for 30 minutes. The vacuum was released and 1160 grams of propylene oxide charged to the autoclave at 50 p.s.i.g.

pressure while maintaining the temperature at 120° C. The excess propylene oxide was vented to the atmosphere when the acid number had decreased to about 4. The reaction mixture was treated with 130 grams of 85% $H_3PO_4$ and 25 grams of S–51 Darco activated carbon, transferred to a spray deodorizer, and deodorized for 30 minutes at 80° C. and 10 mm. pressure and the mixture filtered. The reaction product contained 89% propylene glycol monoester, 4% propylene glycol diester, 6.1% free fatty acid, and 0.61% free propylene glycol.

EXAMPLE 5

Example 4 was repeated except that 4000 grams of Hystrene 9016 fatty acid (92% palmitic acid) and 900 grams of propylene oxide were employed. The resulting product contained 89% propylene glycol monoester, 3% propylene glycol diester, and 7.3% free fatty acid, and 0.61% free propylene glycol.

EXAMPLE 6

A mixture of 545 grams of Industrene 254 fatty acid (50–54% stearic acid and 40–44% palmitic acid) and 49.5 grams of potassium oleate are heated to 125° C. and vacuum stripped at 0.5 mm. for two hours. 555 grams of the mixture are charged to a one liter autoclave and heated to 100° C. The autoclave is vented to 5 p.s.i.g. and 178 grams of propylene oxide charged over a forty minute period. The charge is heated for an additional 175 minutes. The unreacted propylene oxide is vented to the air and the reaction mixture neutralized with 17.8 grams of 85% $H_3PO_4$. The mixture is then vacuum stripped at 70–80° C. and 1 mm. of pressure for 0.5 hour, treated with 2% Darco KB activated carbon at 60–70° C. for 0.5 hour, and filtered through a Pyrex M filter funnel.

In the following example, the catalyst is partially neutralized before the desired acid number is reached, the reaction continued until the desired acid number is reached, and then the reaction terminated by neutralizing the rest of the catalyst.

EXAMPLE 7

495 grams of Industrene 254 fatty acid (50–54% stearic acid and 40–44% palmitic acid), 20 grams of Emersol 233LL fatty acid (87%) oleic acid and 8.9 grams of powdered potassium hydroxide (85% assay) is charged to a 1 liter stirred autoclave, flushed with nitrogen and heated to 120° C. The autoclave is vented to 5 p.s.i.g. of pressure, 100 grams of propylene oxide added, and the charge reacted until an acid number of 11 is obtained. The charge is cooled, 10 grams of 85% $H_3PO_4$ added, and agitated for 15 minutes at 70–90° C. The reactor is flushed with nitrogen, reheated to 120° C., vented to 5 p.s.i.g. of pressure, 25 grams of propylene oxide added, and reacted to an acid number of 1.4. The charge is cooled to 92° C., agitated with 5.5 grams of 85% $H_3PO_4$ for 15 minutes and removed from the reactor. The product is vacuum stripped at 70° C. and 1 mm. of pressure for 30 minutes, treated with 10.8 grams of Darco KB activated carbon at 60–80° C. for 30 minutes, and filtered.

The proportions of the added emulsifiers in the liquid shortenings are variable. Generally, from about 2% to about 12%, by weight, based on the liquid shortening as a whole, will produce a clear liquid shortening effective for the desired purpose, with a preferred range being from about 6% to about 10%. Poor quality cakes are obtained if the liquid shortening contains less than about 2% of the emulsifier. Although good quality cakes are obtained by using more than about 12% of the emulsifier, such liquid shortenings will not remain clear on standing at room temperature. It has also been found that the amount of stearic acid ester provided by the emulsifier should be kept below about 6% by weight of the liquid shortening as a whole in order to insure that the liquid shortening remains clear at room temperature. Although emulsifiers prepared from high purity stearic acid yield excellent high volume baked products, the liquid shortening will not remain clear if the amount of stearic acid ester provided by the emulsifier is substantially above 6%. In other words, no more than about 8% of an emulsifier made from fatty acid containing 75% stearic acid should be used whereas 12% of an emulsifier made from fatty acid containing 50% stearic acid can be used.

The following examples are illustrative of liquid shortenings made in accordance with the present invention. It will, of course, be understood that the triglyceride oils are refined and preferably deodorized and, if necessary, winterized. All parts listed are by weight.

EXAMPLE 8

Liquid shortenings were prepared by blending the emulsifier of Example 1 with cottonseed oil in various proportions and heating until the emulsifier dissolves. The appearance of the liquid shortenings at various intervals are shown in the table below.

TABLE I

| Percent Emulsifier in Cotton Seed Oil | Appearance at Room Temperature (74° F.) | | | | |
|---|---|---|---|---|---|
| | 1 Day | 7 Days | 17 Days [1] | 20 Days [2] | 30 Days |
| 2 | Clear | Clear | 10% solid separation. | Clear | Clear. |
| 6 | do | do | Pasty gel | do | Do. |
| 10 | do | do | do | do | Do. |
| 12 | do | do | Solid gel | do | Do. |

[1] Samples placed in 40° F. for 24 hours prior to 17th day. Results show appearance of samples as removed from 40° F. storage.
[2] Appearance of samples 3 days after removing from 40° F. storage.

EXAMPLE 9

Liquid shortenings were prepared by blending the emulsifier of Example 2 with different vegetable oils in various proportions. The appearance of the liquid shortenings after one week are shown in the table below.

TABLE II

| Percent Emulsifier | Oil | Appearance |
|---|---|---|
| 8 | Cottonseed | Clear. |
| 10 | do | Do. |
| 8 | Corn | Do. |
| 8 | Safflower | Do. |
| 8 | Soybean | Do. |

EXAMPLE 10

A clear liquid shortening was prepared by blending 8 parts of the emulsifier prepared in Example 3 with 92 parts of cottonseed oil. The clear liquid shortening was stored in a freezer for four days and then allowed to remain at room temperature (68°–70° F.) for 22 days. At the end of the 26 day period, the liquid shortening was 100% clear.

In Table III below there are presented data showing the performance of clear liquid shortenings of the present in the production of cakes. White cakes (130% sugar) were made using the clear liquid shortening indicated in the table below. The cakes were made by mixing 181.6 grams of cake flour, 236.1 grams of sugar, 18.2 grams of non-fat dried milk solids, 4.53 grams of salt, 9.9 grams of baking powder, 2.55 grams of cream of tartar, 85 grams of the liquid shortening, and 105 grams of water for two minutes at #1 speed in a three-quart Hobart bowl with paddle. 27.2 grams of water was added slowly and mixed for three minutes at #1 speed. 13.6 grams of whole eggs and 122.5 grams of egg whites were added slowly and mixed for 2 minutes at #1 speed. 350 grams of this batter was poured into two 8-inch pans and baked at 350° F. for 27 minutes. The results are shown in the table below.

TABLE III

| Liquid Shortening | Batter Appearance | Batter Specific Gravity | Vol. of 2 layers in cc. | Grain Remarks |
|---|---|---|---|---|
| Shortening of Example 8 containing 10% emulsifier | Smooth and Creamy | 0.80 | 2,110 | Good, Uniform. |
| Shortening of Example 8 containing 12% emulsifier | do | 0.79 | 2,110 | Do. |
| Shortening of Example 9 containing 10% emulsifier | do | 0.84 | 2,180 | Do. |
| Shortening of Example 10 containing 8% emulsifier | do | 0.98 | 2,090 | Do. |

The clear liquid shortenings of the present invention can be utilzied in baked products at lower shortenings levels. In order to illustrate, two white cakes were made according to the recipe utilized in the cakes of Table III, except that the amount of shortening was 75 grams and 64 grams respectively. The clear liquid shortening employed was the shortening of Example 8 containing 12% emulsifier. The results are shown in the table below.

TABLE IV

| Liquid shortening | Batter Appearance | Batter Specific Gravity | Vol. of cake in | Grain Remarks |
|---|---|---|---|---|
| 75 grams | Smooth and Creamy. | 0.80 | 2,180 | Good, Uniform. |
| 64 grams | do | 0.87 | 2,040 | Do. |

Included within the purview of the present invention are liquid shortenings containing in addition to the propylene glycol emulsifiers described above, minor proportions of one or more supplemental emulsifiers such as those listed below. These latter supplemental emulsifiers have heretofore been used or suggested for use in shortenings, cake batters, and baked dough products. They include, for instance, stearyl lactate, polyoxyethylene sorbitan fatty acid esters, such as polyoxyethylene(20)sorbitan monostearate, polyoxyethylene(20)sorbitan tristearate, and the like, polyoxyethylene stearates, isosorbide esters, reaction product of isosorbide esters and alkylene oxide, sorbitan esters, such as sorbitan monoleate, and the like, mono and diglycerides of fat forming fatty acids, such as glycerol monoleates and lactylated esters thereof, acetylated monoglycerides, lecithins, and the like.

All of these emulsifiers, which are illustrative of various others falling into the same general category, effectively supplement the propylene glycol monoester in shortening compositions, particularly for baking purposes. The said supplemental emulsifiers appear to act synergistically with the propylene glycol monoester emulsifiers heretofore described. Thus, for instance, the addition to liquid shortenings, such as shown in Examples 8 to 10, inclusive, of about 1% stearyl lactate, serves to enable the whipping into the cake batters of even more air than can be effectively incorporated by means of the liquid shortenings of the aforesaid Examples 8 to 10, inclusive. This is readily observed by determining the specific gravity of said cake batters.

While the advantages of the use of the liquid shortenings of the present invention are particularly significant in commercial bakeries, they also manifest themselves in the household for use by the housewife. Thus, for example, cakes can readily be prepared by hand mixing methods without the utilization of electrical mixers or the like. The liquid shortenings disperse very readily in the cake or other flour batter ingredients and it is unnecssary to resort to conventional creaming processes of incorporating the sugar with plastic shortenings as is common practice in the baking of cakes today wherein plastic shortenings are utilized. Furthermore, the housewife can readily and accurately measure the liquid shortening in a measuring cup thereby eliminating the problem of attempting to obtain an accurate measure of plastic shortenings. Again, the washing or cleaning of utensils and other equipment with which the liquid shortenings of the present invention come into contact in use is simple, ordinary cleansers serving readily to effect removal of the liquid shortening and ingredients containing the same from said equipment.

What is claimed as new and desired to be protected by Letters Patent of the United States is:

1. A liquid shortening which is clear, stable, and effective for the production of baked goods of excellent volume and texture, comprising a normally liquid edible triglyceride oil containing dissolved therein an emulsifier prepared by reacting propylene oxide with fatty acid containing 12–18 carbon atoms in the presence of a sufficient amount of a catalyst selected from the group consisting of potassium hydroxide, potassium salts of weak organic acids, potassium alcoholates, and mixtures thereof, to furnish at least about 1.0% of KOH equivalent based on the weight of the fatty acid, at temperatures between about 100° C. and about 160° C. until the acid number decreases to less than about 10, venting unreacted propylene oxide and neutralizing the catalyst before the acid number has decreased to less than about 1 with at least about 90 mol percent of acid, based on the amount of catalyst charged, which forms a potassium salt that is insoluble in the reaction product, and separating the potassium salt therefrom, the proportion and composition of emulsifier being so chosen that it provides from about 2% to about 12% by weight of emulsifier based on the liquid shortening as a whole and no more than about 6% by weight of stearic acid ester.

2. The liquid shortening of claim 1 wherein about 95 mol percent to about 105 mol percent of acid, based on the amount of catalyst charged, is used to neutralize the catalyst.

3. The liquid shortening of claim 2 wherein the acid used to neutralize the catalyst is phosphoric acid.

4. The liquid shortening of claim 1 wherein the catalyst is potassium hydroxide.

5. The liquid shortening of claim 1 wherein the reaction is continued until the acid number has decreased to below about 5.

6. The liquid shortening of claim 1 wherein the fatty acid is a mixture of stearic acid and palmitic acid.

7. The liquid shortening of claim 6 wherein the fatty acid is a mixture of about 40–60% stearic acid and about 60–40% palmitic acid.

8. The liquid shortening of claim 1 wherein the amount of propylene oxide is 1.0 to 1.2 mols per mol of free fatty acid.

9. The liquid shortening of claim 1 wherein the amount of catalyst is about 1.5% of KOH equivalent based on the weight of fatty acid charged.

10. The liquid shortening of claim 1 containing 1% by weight of stearyl lactate based on the weight of the liquid shortening as a whole.

11. A liquid shortening which is clear, stable, and effective for the production of baked goods of excellent volume and texture, comprising a normally liquid edible triglyceride oil containing dissolved therein an emulsifier prepared by adding, at a pressure from about 2 to about 10 atmospheres, a stoichiometric excess of propylene oxide, based on the amount of free fatty acid, to a mixture of fatty acid containing 12–18 carbon atoms and a catalyst selected from the group consisting of potassium hydroxide, potassium salts of weak organic acids, potassium alcoholates, and mixture thereof, said mixtures having been preheated to a temperature in the range of from about 100° C. to about 160° C. and containing at least about 1.0%, by weight, of said catalyst, maintaining the temperature in the range of from about 100° C. to about 160° C. and reacting the resulting mixture until the acid number has decreased to below about 10, venting unreacted propylene oxide and neutralizing the catalyst before the acid number has decreased to below about 1 with at least about 90 mol percent of acid, based on the amount of catalyst charged, which forms a potassium salt that is insoluble in the reaction product, and separating the potassium salt therefrom, the proportion and composition of emulsifier being so chosen that it provides from about 2% to about 12% by weight of emulsifier based on the shortening as a whole and no more than about 6% by weight of stearic acid ester.

12. The liquid shortening of claim 11 wherein about 95 mol percent to about 105 mol percent of phosphoric acid, based on the amount of catalyst charged, is used to neutralize the catalyst.

13. A liquid shortening which is clear, stable, and effective for the production of baked goods of excellent volume and texture, comprising a normally edible triglyceride oil containing dissolved therein an emulsifier prepared by reacting, at a pressure from about 2 to about 5 atmospheres, a stoichiometric excess of propylene oxide, based on the amount of free fatty acid, with a fatty acid containing 12–18 carbon atoms in the presence of at least about 1.0% of potassium hydroxide based on the weight of the fatty acid, at temperatures between about 100° C. and about 160° C. until the acid number decreases to less than about 5, venting unreacted propylene oxide and neutralizing the potassium hydroxide before the acid number has decreased to less than about 1 with from about 95 mol percent to about 105 mol percent of phosphoric acid based on the weight of potassium hydroxide charged, and separating the potassium salt therefrom, the proportion and composition of emulsifier being so chosen that it provides from about 2% to about 12% by weight of emulsifier based on the shortenings as a whole and no more than 6% by weight of stearic acid ester.

14. A liquid shortening which is clear, stable, and effective for the production of baked goods of excellent volume and texture, comprising a normally liquid edible triglyceride oil containing dissolved therein about 2% to about 12%, based on the weight of the shortening as a whole, of an emulsifier prepared by adding 1.0 to 1.2 mols of propylene oxide, per mol of free fatty acid, to a mixture of fatty acid and potassium hydroxide, said fatty acid being a mixture of about 50% stearic acid and 50% palmitic acid, said mixture containing about 1.5% potassium hydroxide, and said mixture having been preheated to a temperature in the range of from about 115° C. to about 130° C., maintaining the temperature in the range of from about 115° C. to about 130° C. and reacting the resulting mixture until the acid number has decreased to below about 5, venting unreacted proplyene oxide and neutralizing the potassium hydroxide before the acid number has decreased to less than about 2 with about 100 mol percent of phosphoric acid based on the amount of potassium hydroxide charged, and separating the potassium salt therefrom.

15. The liquid shortening of claim 14 containing about 1% by weight of stearyl lactate.

References Cited

UNITED STATES PATENTS

| | | | |
|---|---|---|---|
| 3,097,098 | 7/1963 | Allen et al. | 99—123 |
| 3,071,472 | 1/1963 | Hager et al. | 99—94 |
| 3,144,341 | 8/1964 | Thompson | 99—123 |
| 3,145,108 | 8/1964 | Howard | 99—118 |

OTHER REFERENCES

Wrigley et al.: Journal of Society of American Oil Chemists, January 1957, vol. 34, No. 1, pp. 39–43.

Wrigley et al.: Journal of Society of American Oil Chemists, January 1959, vol. 36, No. 1, pp. 34–36.

MAURICE W. GREENSTEIN, *Primary Examiner.*

U.S. Cl. X.R.

260—410.6.

PO-1050
(5/69)

UNITED STATES PATENT OFFICE
CERTIFICATE OF CORRECTION

Patent No. 3,437,492      Dated April 8, 1969

Inventor(s) Gabriel P. Lensack

It is certified that error appears in the above-identified patent and that said Letters Patent are hereby corrected as shown below:

Column 2, line 45, "separaing" should read -- separating --.

Column 4, line 20, "vauum" should read -- vacuum --.

Column 6, line 62, after the word "present" insert the word -- invention --.

Column 7, Table IV, the abbreviation "cc." was left out of the heading "Vol. of cake in ....".

SIGNED AND
SEALED
JUL 28 1970

(SEAL)
Attest:

Edward M. Fletcher, Jr.
Attesting Officer

WILLIAM E. SCHUYLER, JR.
Commissioner of Patents